United States Patent [19]
Gosselin, Jr. et al.

[11] Patent Number: 5,553,555
[45] Date of Patent: Sep. 10, 1996

[54] SYSTEM AND METHOD FOR FLUE GAS PURIFICATION FOR THERMAL POWER UNITS

[75] Inventors: Albert E. Gosselin, Jr., Glendale; Edward R. Bate, Jr.; Dale F. Johnson, both of Pasadena, all of Calif.

[73] Assignee: Dasibi Environmental Corporation, Glendale, Calif.

[21] Appl. No.: 234,546

[22] Filed: Apr. 28, 1994

[51] Int. Cl.$^6$ .................................................. F23J 15/00
[52] U.S. Cl. ........................ 110/215; 110/216; 110/234; 55/341.3; 55/341.6
[58] Field of Search .................................. 110/203, 215, 110/216, 302, 306, 234, 345; 55/341.1, 341.3, 341.5, 341.6

[56] References Cited

U.S. PATENT DOCUMENTS

| | | | |
|---|---|---|---|
| 5,029,535 | 7/1991 | Krigmont et al. | 110/345 |
| 5,224,334 | 7/1993 | Bell | 60/274 |
| 5,305,697 | 4/1994 | Greene et al. | 110/345 |
| 5,339,755 | 8/1994 | Smith | 110/345 |

FOREIGN PATENT DOCUMENTS 1549565  3/1990  U.S.S.R. ................. 55/341.1

*Primary Examiner*—Henry A. Bennett
*Assistant Examiner*—Susanne C. Tinker
*Attorney, Agent, or Firm*—K. David Crockett; Crockett & Fish

[57] ABSTRACT

A system and method for purification of combustion gases cools the combustion gases to an optimal oxidation temperature, oxidizes the combustion gases, injects water or uses natural moisture content to form acid aerosols, neutralizes the acid aerosols with an alkaline solution, and then filters the acid aerosol, alkaline solution and water from the combustion gases. The purified gas stream is then exhausted from the system. Oxidation can be provided in stages to obtain optimal oxidation of different combustion gas components with different optimal oxidation temperature ranges. When used in a thermal power plant, the cooling of exhaust gases can be accomplished by regenerative preheating of combustion air, boiler feedwater or combustion fuel, and the clean exhaust gas can be cooled below the conventional exhaust stack temperature range, thus enhancing power plant efficiency.

6 Claims, 4 Drawing Sheets

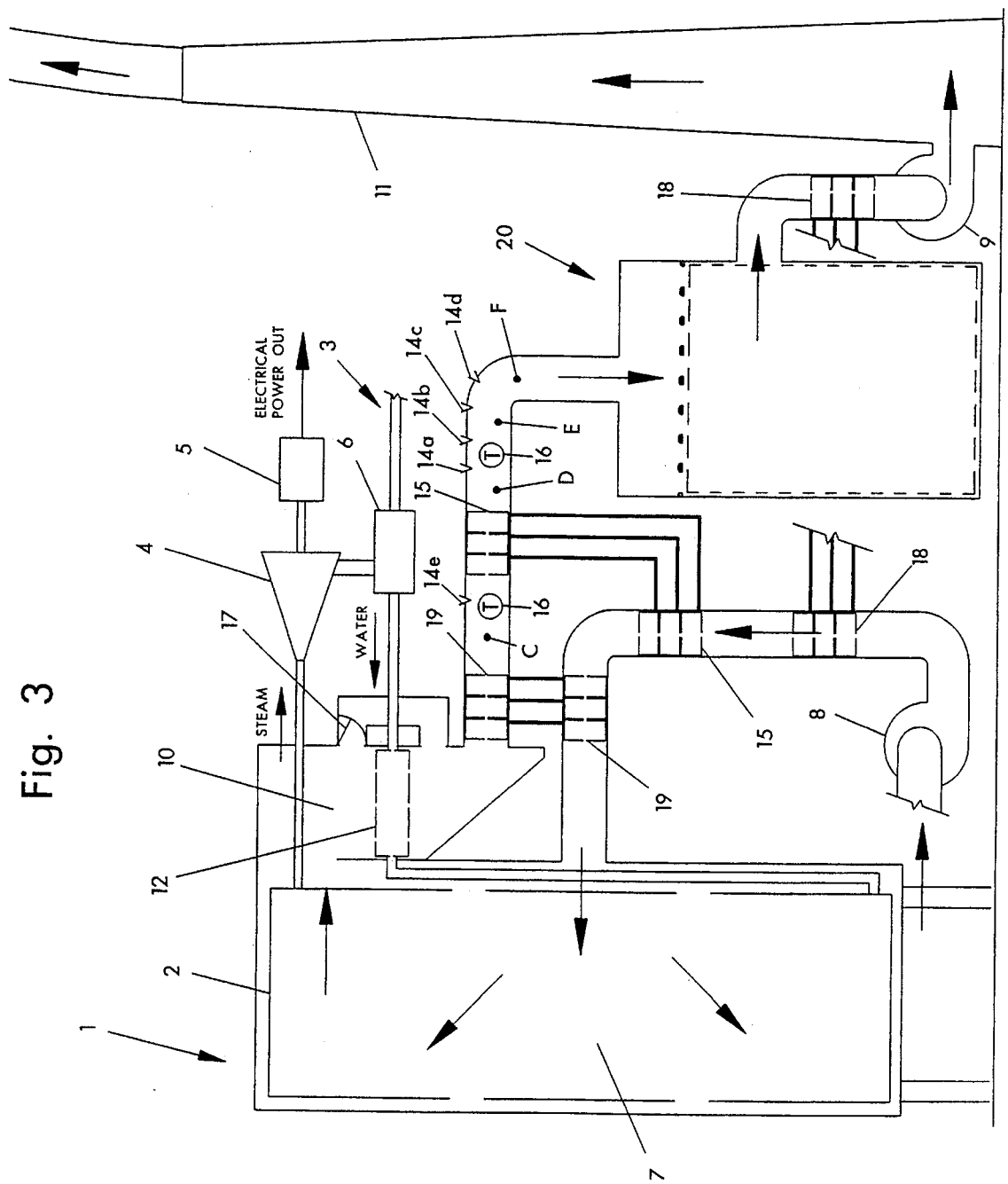

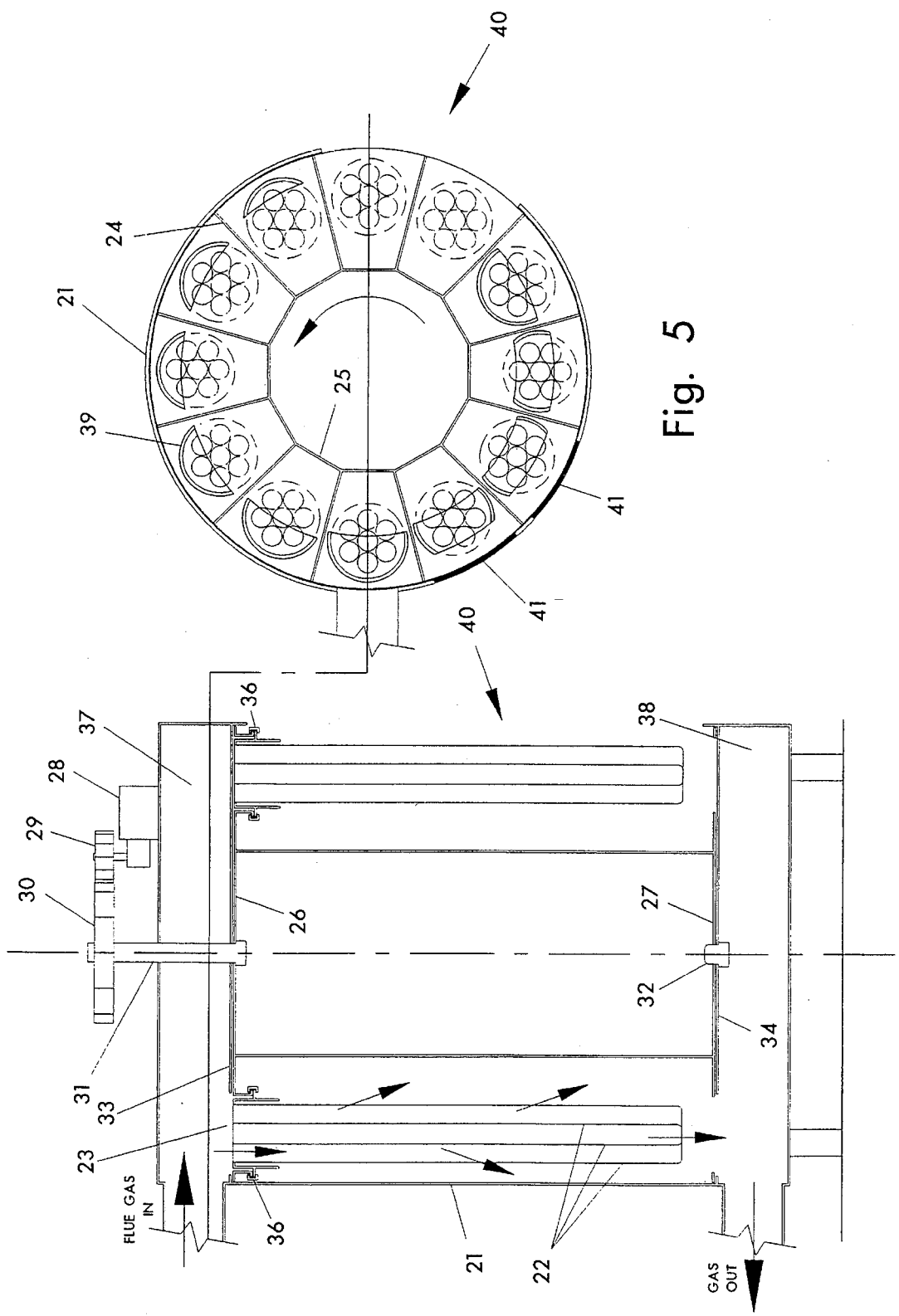

SYSTEM AND METHOD FOR FLUE GAS PURIFICATION FOR THERMAL POWER UNITS

FIELD OF THE INVENTION

The inventions described herein relate to the field of pollution controls and thermal power plant operation.

BACKGROUND OF THE INVENTION

Thermal power plants are designed to produce electrical power with steam driven turbines wherein the steam is produced by burning fuel to heat water in a boiler. The fuels used in thermal power plants includes coal, oil, and natural gas and combinations thereof, and in some cases bagasse, wood chips, or even rubber tires. Principal products of combustion include excess oxygen, nitrogen, carbon dioxide, and water vapor. Other by-products of combustion include particulate and ash, sulfur dioxide and sulfur trioxide (for sulfur bearing fuels), oxides of nitrogen, and carbon monoxide. These by-products are harmful to the environment and are considered as pollutants.

The pollution control systems described herein are directed at removing some or all of these pollution components from combustion gases of thermal power plants. The systems are applicable to thermal power units, pulp and paper incinerators, or any exhaust gas from a fuel burning plant. However, some embodiments are ideally suited for use in the operation of thermal electrical generation plants because a significant increase in boiler efficiency may be obtained.

FIG. 1 schematically illustrates various features of a typical thermal power unit including heat recovery equipment from the exit flue gas. Combustion of the fuel in the firebox 1 produces heat to create steam in the boiler 2 from a closed cycle of purified, recirculating water supplied from the feedwater system 3, and boiled in the boiler 2. The steam is used to operate a turbine 4 and generator 5 to produce electrical power. Preheat is usually added to the feed water by feedwater heaters 6 using extraction steam from various stages of the turbine. The water is introduced into the boiler by high pressure feed pumps where it flows through heat exchange tubes 7 contained on the inside surfaces of the boiler's combustion chamber or firebox 1, in which continuous combustion takes place at high temperature.

Fuel is injected into the firebox using a fuel injection system comprising a high pressure fuel pump and fuel line (not shown). Combustion air is injected into the firebox with a combustion air injection system comprising high capacity blowers in the form of forced draft fans 8 and/or induced draft fans 9 and regenerative air preheaters 13. The resulting heat is transferred to the feedwater through the heat exchange tubes by both convection and radiation, and the water is thereby converted into steam which is used to operate the turbine 4. After combustion, the burnt fuel and air mixture, called flue gas, is expelled from the fire box through the flue 10.

Not all of the heat generated by the combustion process is transferred to the water to produce steam, and often considerable heat remains in the flue gas to be later discharged into the atmosphere from a stack 11 as waste heat. Boiler flue gas temperature in the flue 10 (at point A) will range from about 1500° to 1900° F., and will fluctuate according to boiler operating demands. Downstream from the fire box, just before final exit of the combustion gases from the boiler, it is normal to include a gas-to-water heat exchanger 12, usually called an economizer, to additionally preheat the feedwater supply using the hot flue gas with a resultant decrease in final exit flue gas temperature to between 650° and 800° F. (or higher).

In addition, prevalent design procedure is to include a regenerative air preheater 13 to recover heat from the combustion gases and, by means of rotating metal plates or baskets (not shown), to transfer some of this heat to the incoming combustion air.

Although boiler thermal efficiency is increased by preheating both the water and combustion air, final exhaust gas temperature is lowered as a result, and this reduces the buoyancy of the exiting plume. A less buoyant plume will rise less high from the stack exit into the atmosphere, resulting in less mixing and dilution with the atmosphere, and it will fall more quickly to ground level in the vicinity of the local surroundings, increasing local measurements of pollution levels. The temperature range of exhaust gas entering the stack (at point B) is standardized in the thermal power industry between a low of 250° F. and a high of 400° F. for discharge to either the induced draft fan 9 inlet or, in most cases, directly to the stack 11 (when only a forced draft fan is used).

For sulfur bearing fuels, approximately 1 to 2 percent of the sulfur present in the flue gas normally converts to sulfur trioxide. The acid dew point (point of condensation) of sulfur trioxide as sulfuric acid is about 220° F. As the regenerative air preheater plates pass from the cooler supply air side to the hot combustion flue gas side, average cold end metal temperatures (CEMT) below the acid dew point are presented to the sulfur trioxide and this way cause condensation, deposition, and corrosion. Some boilers use steam heat on the entering cold air to raise the CEMT to prevent sulfur trioxide condensation. Whether or not steam heat is used, the condensation of sulfur trioxide can be avoided or minimized by maintaining flue gas temperature and the CEMT well above the acid dew point. Additionally, some fuels such as natural gas have a high water content which carries over as water vapor in the flue gas. In this case, the exit gas temperature is also held in the designated range because of the high water vapor content which would create a dense nonbuoyant and opaque water vapor plume if exhausted at temperatures near the condensation point of water. The latter plume formation is also affected by ambient air mixing temperature.

Thus, corrosion problems and pollution problems have dictated high exhaust temperature and have prevented recoupment of the heat in the exhaust gas. By using the heat content remaining in the flue gas to further preheat combustion air a large gain in thermal efficiency can be realized. Heat recovery from the flue gas to the incoming combustion air (utilizing heat exchangers) represented by a drop in flue gas temperature of 40° F. results in an increase of approximately one percent in boiler efficiency. If there were no problems with corrosion or a water vapor plume, a minimum exit flue gas temperature of 160° to 180° F. would suffice to ensure buoyancy of the plume for acceptable ground level concentrations even if no pollutants were removed, and the boiler efficiency would be increased significantly.

SUMMARY OF THE INVENTION

The pollution control system described herein uses ozone to produce substantial gas phase oxidation of selected pollutants contained in the flue gas which result from combustion in the boiler, namely oxides of nitrogen, sulfur and carbon. Before oxidation, the flue gas is cooled to a temperature range allowing optimal oxidation. Upon hydration with any carryover contained in the boiler combustion gas and water injected into the exhaust stream and neutralization by an alkaline solution injected into the exhaust stream, these aerosol pollutants are filtered through dolomite-coated metal mesh bag filters and mechanically removed along with particulates normally removed by the bag filters. When the system is used to clean the exhaust of a thermal power plant, the cooling required by the system can be accomplished by heat exchange with combustion air, feedwater or fuel, thereby enhancing the efficiency of the power plant. Because the process removes sulfurous acid and moisture before entry into the exhaust stack, the exhaust gases may be cooled well below the conventional temperature range, thereby allowing further enhancement of the power plant efficiency.

BRIEF DESCRIPTION OF THE DRAWINGS

FIG. 3 shows another embodiment of the pollution control system.

FIG. 4 shows a bag filter house with removable cartridges.

FIG. 5 shows a horizontal cross-section of the bag filter house.

DETAILED DESCRIPTION OF THE DRAWINGS

Figure 1:
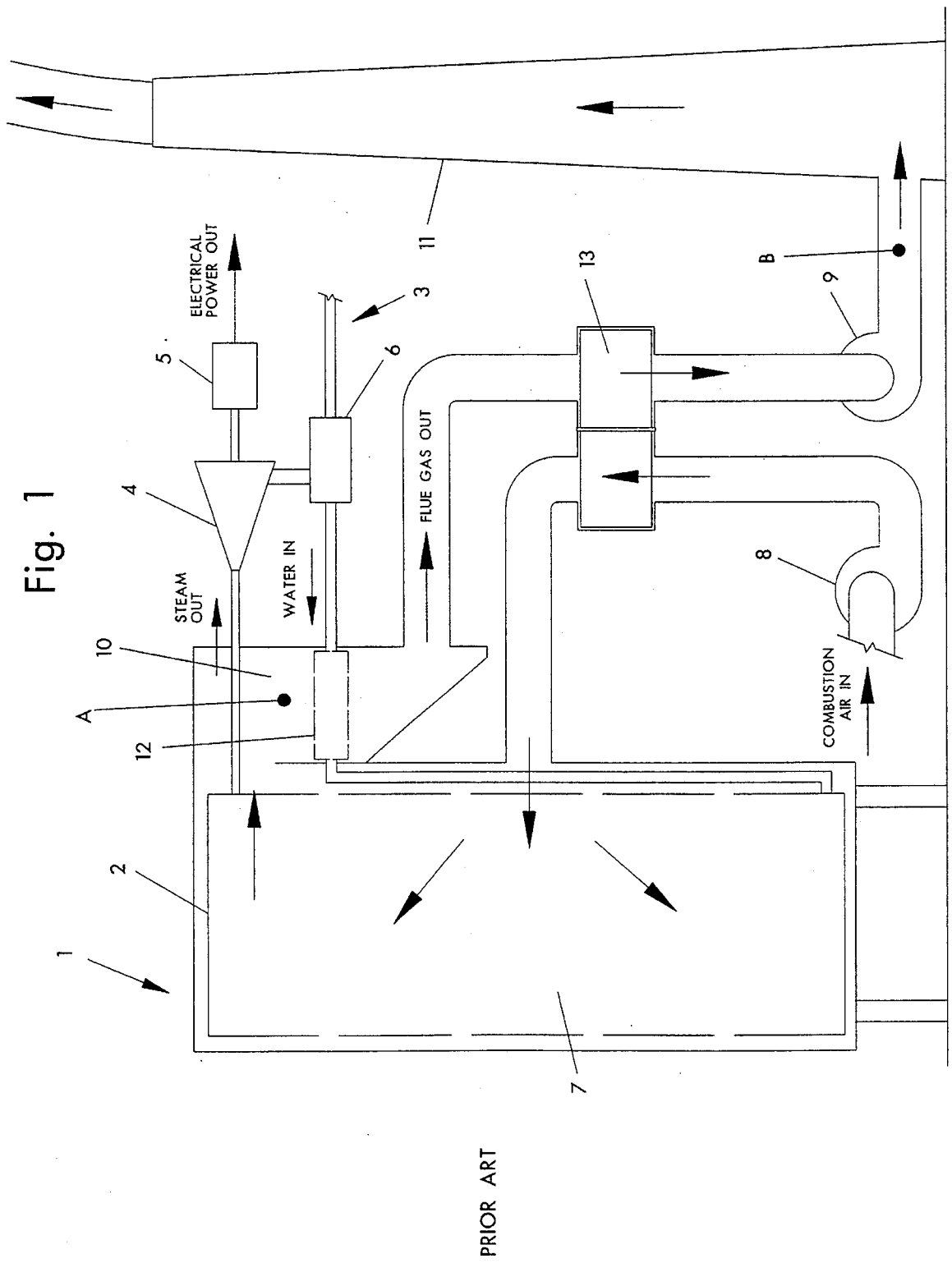
FIG. 1 shows a typical arrangement of exhaust systems used in thermal power plants.
Figure 2:
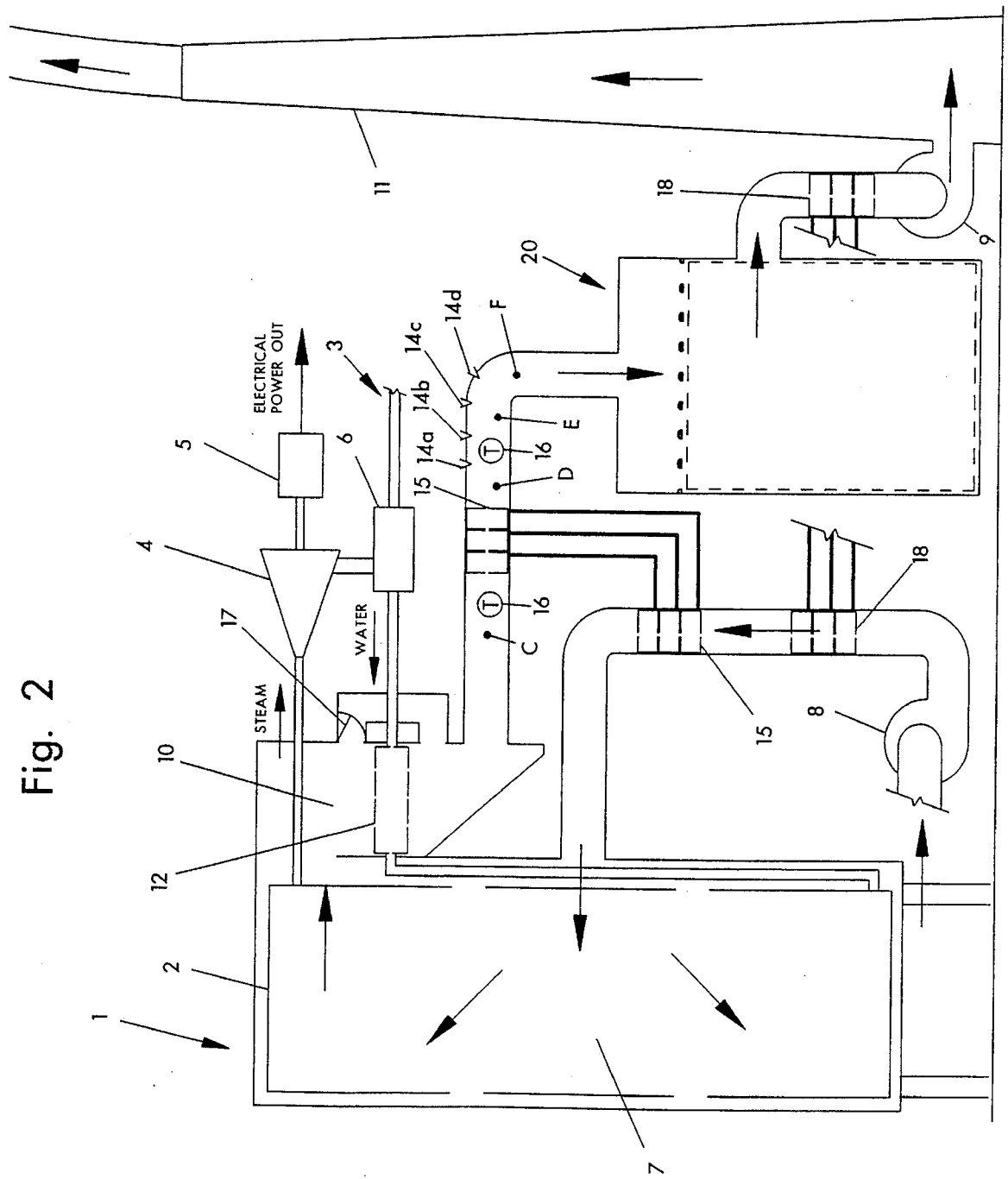
FIG. 2 shows a first embodiment of the pollution control system.

FIG. 2 illustrates steam boiler exhaust system representing embodiments of the inventions described below for use in power plants and other combustion processes. In general, the system includes a cooler for cooling the flue gas to a temperature range in which oxidation can occur readily, an oxidant injection system for injecting an oxidant into the flue gas stream at a point downstream of the cooler, and a high efficiency filter for removing the products of reaction. A water injection system for injecting water into the flue gas stream downstream of the cooler may be included to supplement the natural water content of the flue gas if necessary to facilitate the removal. An alkaline injection system may be included to neutralize the acid aerosols which are expected products of the reaction and thus reduce the acidity of the flue gas stream entering the high efficiency filter. Additionally, a cooler may be placed downstream of the high efficiency filter to further cool the flue gas before it is exhausted from the system. Where the system is used to clean the flue gas of a thermal power plant, the coolers may be cooled with combustion air, fuel, or feedwater to enhance the thermal efficiency of the power plant.

In this first embodiment, the flue gas or combustion gas is cooled by a cooler placed just downstream of the economizer or boiler flue gas outlet. FIG. 2 shows a cooler comprised of a multi-bank, liquid coupled, regenerative heat exchanger 15 which allows precise temperature control of flue gas temperature. The number of banks used for cooling can be varied, as flue gas or fire box temperature varies, in order to obtain a temperature of 200° to 220° F. at Point D. Flue gas temperature will vary with power load, so that it can be appreciated that multi-bank heat exchangers will facilitate precise temperature control. Temperature sensors 16 at Points C and D can be used to provide temperature input to a control system (not shown) which controls valves supplying a cooling fluid to the regenerative heat exchanger banks in order to maintain the proper temperature at Point D. Other systems for controlling the temperature at Point D may be employed in alternate embodiments, including the regenerative air preheaters currently in use. While liquid coupled regenerative heat exchangers which use flue gas to heat incoming combustion air are depicted in the drawing, the heat exchanger could also be used to heat incoming feedwater or incoming fuel, and the heat exchanger may be of any suitable design. All heat exchangers in the flue gas stream may be provided with soot blowers to prevent particulate build-up which will interfere with heat exchange. The heat exchanger exchanges heat between the flue gas and the feedwater, fuel or, as depicted in FIG. 2, the combustion air.

The heat exchanger is operated to cool the flue gas to a temperature range just above the acid dew point, but high enough to prevent condensation on the heat exchanger tubes. Induced draft fan 9 is operated to maintain several inches of water negative pressure. In this temperature and pressure range, the sulfur compounds, nitrogen compounds and carbon compounds may be readily oxidized by reaction with ozone and this temperature range is an optional temperature range for oxidation of these compounds. Optimization of the temperature, pressure, and flow and quantity of ozone injected allows for the controlled generation of sulfur oxides, nitrogen oxides and carbon oxides. Acid aerosols of nitric acid, nitrous acid, sulfuric acid, sulfurous acid and carbonic acid and mixed aerosol of these acidic products are expected to be produced upon the condensation of the water vapor in the combustion gas.

Ozone is used as the oxidant in the first embodiment. Point D represents an injection chamber housing nozzles 14a for ozone injection to cause oxidation of nitrogen and sulfur, oxides of nitrogen, sulfur, nitrogen- and sulfur-containing compounds, and carbon that are present in the combustion gases. In the temperature range of 200°–250° F. provided by the heat exchangers, and a slight negative pressure of up to ten inches of water vacuum, as provided by induced draft fan 9, oxidation of nitrogen, sulfur, nitrogen oxides and sulfur oxides and nitrogen- and sulfur-containing compounds, with ozone occurs readily.

In this temperature range, the removal of the oxidation products is also facilitated by the presence of water vapor. Water vapor will always be present in the flue gas, but injection of a water mist may be needed to further increase the humidity of the flue gas to facilitate the desired neutralization reactions to occur downstream. Accordingly, water injection nozzles (14b) are located at Point E to provide for injection of high pressure atomized water which may be used to increase the humidity and supplement the water content of the flue gas. Water will combine with sulfur dioxide to form sulfurous acid aerosol, with sulfur trioxide to form sulfuric acid aerosol and with nitrogen dioxide to form nitric acid and nitrous acid aerosols, sulfur dioxide, nitric oxide, nitrogen dioxide and other oxides of nitrogen at the temperature resulting from operation of economizer 12 and heat exchanger 15. Thus, the method induces oxides of sulfur and nitrogen compounds into acid aerosol states for subsequent removal by filtration.

Point F also indicates a point where an alkaline or neutralizing solution may be injected into the combustion gas stream which now contains acid aerosols produced as described above. Neutralization helps preserve the dolomite film used in the bag filters. Neutralization also allows for easier handling of the acid aerosol and moisture in the exhaust stream which is removed by the bag filterhouse described below. Neutralization also allows use of less acid resistant material in the bag filters and filterhouse. The alkaline solution will be injected through nozzles 14c at locations before the bag filters and combine with and be partially diluted by the condensing water vapor contained in the flue gas. The resulting solution will maintain a high, neutral or slightly acidic pH in the aqueous contacting phase flowing down and over the dolomite films on the filter bags, thereby minimizing the dissolution of the dolomite.

For the first embodiment, dry lime, CaO, may be used, or a caustic NaOH or KOH solution may be used as the neutralizing solution.

Solid dry lime may be added directly to the flue gas, using the water vapor in the flue gas to hydrate the lime and convert it to calcium hydroxide. The lime may also be injected as a solution of water and lime through nozzles 14d, or dispersed as powder in the inlet plenum of the filterhouse 20. The resultant hydrated lime solution flows down over the filter bags and provides the contacting phase for the neutralization and removal of the aerosol species. The cascading effect of the hydrated lime solution acts as a curtain through which the flue gas must penetrate in order to pass through the bag and into the induced draft fan and exhaust stack. The efficient contacting of gases through the alkaline liquid phase neutralizes the sulfuric, sulfurous, nitrous, nitric and combined nitrogen-sulfur acidic compounds. The removal of some $CO_2$ and carbonic acid in this fashion with hydrated lime will result in the precipitation of $CaCO_3$ solid. This cake or scale may adhere to the dolomite film on the filter bag, but significant quantities of the precipitate are carried downward in the flowing curtain of alkaline solution. $CaCO_3$ cake which accumulates on the dolomite film and bag filters will reinforce the integrity of bag filters.

In another embodiment, the alkaline solution injected through nozzles such as nozzles 14*d* at Point F is formed with caustic sodium hydroxide or potassium hydroxide. It should be appreciated that any base or basic solution will be useful in the process.

Thus, the exhaust stream downstream of Point F will be comprised of a stream of atomized acid aerosols and neutralizing solution and any precipitating solids formed upon neutralization is passed to a bag filterhouse 20. The exhaust stream may be partly neutralized at point F and may be partly neutralized through further mixing in the bag filterhouse and through contact with the dolomite film on the filter.

Referring to FIG. 4, a high efficiency filtration system is provided to remove the acid aerosols, alkaline solution, moisture and any particulate for the flue gas. The high efficiency filter of the first embodiment comprises a revolving cartridge bag filterhouse 20 which removes the acid aerosols, alkaline solution and most of the particulates. The bag filterhouse 20 uses metal mesh filter bags intended for top flue gas entry at low temperature and "wet" conditions. The bags are pre-coated with dolomite or other filter aid material such as diatomaceous earth. The bag filters revolve through the filterhouse to expose some bags to the flue gas stream while others are isolated from the stream. In this manner, fresh filtration surface may be continuously introduced, minimizing fluctuations in overall filter pressure drop. Filter bags are introduced and taken out of service externally, where they are cleaned, re-coated with dolomite or other filter aid material, and tested. Exhaust gases will exit from the bag filterhouse as clean, dry gas, the acid aerosols, particulate content and moisture having been removed by the bag filters. The bulk of acid aerosols, neutralizing solution, excess moisture and particulates exit the bag filterhouse in the removable cartridges and partially as an aqueous solution or slurry from the base of the filterhouse structure. The various components can be reclaimed or the ash-slurry may be discarded in a safe manner using conventional waste disposal techniques.

Another multi-bank, liquid coupled, regenerative heat exchanger 18 is included which operates on cleaned, acid- and particle-free, low moisture gas and reduces exit flue gas temperature to the lowest level possible while maintaining proper buoyancy characteristics of the plume discharge. This temperature is limited only by remaining moisture content of the flue gas and ambient air temperatures after it exits the filterhouse, which will affect the temperature required to maintain an invisible plume. As shown in FIGS. 2 and 3, heat exchanger 18 uses incoming combustion air to cool the flue gas, but the heat exchanger may also be aligned to use incoming fuel or feedwater.

An induced draft fan 9 may be provided to maintain a negative pressure from Point F to the exit of the filterhouse, preventing leakage of unfiltered flue gas from the filterhouse. The need for the induced draft fan will depend upon the integrity of the injection chambers and bag filterhouse, and may not be necessary if the integrity of the injection chambers bag filterhouse can be designed so as to minimize exhaust gas leakage at operating pressures. The induced draft fan at the outlet of the bag filter house will also help maintain stable flow despite the increased pressure drops that will result by operation of the various components of the system.

In an alternative embodiment, suitable for power plants using abnormally high sulfur-bearing fuels, a second optimal temperature range for oxidation of sulfur oxides may be provided and a second ozone injection can be provided to help remove sulfur. In this embodiment as shown in FIG. 3, another independent, multi-bank, liquid coupled, regenerative heat exchanger 19 may be located at the boiler combustion gas exit (with or without a combustion air preheater or an economizer) and another injection chamber may be placed downstream of this heat exchanger. Utilizing the appropriate number of banks of heat exchanger 19 which are in operation will provide variable control of flue gas temperature from 400° to 600° F. or so at point C, and the excess heat will be transferred to the inlet combustion air. The pressure at this point is typically about 3 to 12 inches of water over pressure within the operational pressure ranges. This temperature range and pressure is optimal for conversion of sulfur dioxide to sulfur trioxide in gaseous form by reaction with ozone. Ozone may then be injected through nozzles 14*e* at Point C from three to ten times stoichiometric for any load level of steam delivered. Complete conversion of carbon monoxide to carbon dioxide and a partial conversion of nitric oxide to nitrogen dioxide is expected in this stage. High efficiency oxidation of sulfur dioxide to sulfur trioxide is beneficial to the process but it is not necessary, since acidic aerosols produced directly from sulfur dioxide will be removed by the process described above by acid-base neutralization of sulfurous acid in the alkaline solution. It should be appreciated that oxidation as described in this alternative embodiment may be accomplished to remove a large portion of combustion by-products, so that the pollution control system could be beneficially employed with or without the ozone injection at Point D. As an option, calcium hydroxide may be injected at Point C for carbon dioxide removal. For this option, a damper-controlled bypass duct 17 may be included to maintain a temperature of approximately 1000° F. at the economizer exit upstream of the heat exchanger 19.

In the embodiments depicted in FIGS. 2 and 3, the heat removed by heat exchangers 15 and 18 and 19 is transferred to the incoming combustion air, which will increase overall boiler efficiency. As shown in FIGS. 2 and 3, regenerative heat exchangers are coupled to the combustion air intake system. Heat exchangers 15 and 19 use the heat exchange to control injection chamber temperature to serve the pollution control system while preheating combustion air to enhance plant efficiency. Heat exchanger 18 takes advantage of the low by-product and water-vapor content of the clean exhaust gas to cool the exhaust gas while preheating combustion air to enhance plant efficiency. The pollution control system and regenerative heating system are thus interdependent and operated so as to enhance the functions of each vis-a-vis independent operation. Of course, where desired, as may be the case in incinerators, the pollution control system will still be usefully employed to purify exhaust gases without regenerative heating.

It may be desirable to produce ozone on-site, and the ozone generation equipment will require some power input and will also generate some waste heat. Alteration of the feedwater cycle of each thermal power unit to exchange heat with the ozone generation process can replace or supplement conventional feedwater, fuel or combustion air pre-heating systems. Thus, for example, steam normally used to preheat the feedwater may instead be used for power generation in addition to the steam originally supplied to the turbine, thus increasing power generating capacity. By using this technique, the power used for on-site ozone generation may be ultimately reclaimed, reducing the overall power requirements for ozone production. Also, heat added to the flue gas by ozone injection (and by the reactions with the flue gas components) can be reclaimed by the heat exchangers.

FIG. 4 is a schematic representation of a new bag filterhouse, which facilitates use of the process described above. This figure illustrates only the general construction and operation of the first embodiment. Other filtering methods and filterhouses may be used in the overall system while still incorporating the inventions described herein. As shown in FIG. 4, the bag filterhouse 20 consists of a large cylindrical outer housing 21 which contains the individual filter bags 22 arranged in cartridges 23 of multiple filter bags 22. As shown in FIG. 5, each of the cartridges are contained in cells, separated from each other by full-length radial partitions 24 and from the inner periphery by similar, tangential partitions 25. The overall structure containing these cells may be referred to as a turret. The turret rotates relative to the outer housing 21 of the filterhouse 20. The outer periphery of each cell is open, but abuts the inner wall of the bag filterhouse outer housing 21. Each cell is sealed from the others by a close radial fit between the outer edges of the radial partitions and the inner cylindrical surface of the bag filterhouse 20 outer housing 21. A close fit will minimize leakage of exhaust gases around the partitions and out of the bag filterhouse.

All partitions are fixed at the top and bottom directly to large circular plates 26 and 27, which also closely conform to the inner wall of the baghouse outer cylindrical surface housing of the baghouse structure, again to minimize leakage of exhaust gases around the bag filters and out of the bag filterhouse. The circular plates and interior partitions form a rigid structure or turret which rotates as a unit about the vertical centerline of the filterhouse by a drive mechanism comprising, for example, a motor 28, gears 29 and 30, and drive shaft or axle 31. The driveshaft also performs the function of a radial bearing. A similar shaft 32 also provides radial and thrust bearing at the bottom of the rotating cell structure. The upper circular plate 26 serves as a bag suspension plate, and the lower circular plate 27 serves as a bottom sealing plate. The bag suspension plate, bottom sealing plate and the partitions together form a turret which is rotated inside the bag filter house.

Two fixed circular plates 33 and 34 top and bottom, respectively, are directly attached (with no radial gap) to the cylindrical baghouse filterhouse structure 20 and form a ceiling and floor for the cylindrical bag filterhouse. The rotating turret is "sandwiched" between these two fixed plates with minimum vertical top and bottom gaps to minimize leakage between cells through this region.

As shown in FIGS. 4 and 5, an opening 40 is provided in the outer cylindrical surface of the filterhouse so that external access is provided for bag cartridges for manual changeover from used to fresh bags. A sufficient supply of cleaned and re-coated cartridges may be kept close at hand to the filterhouse for routine on-line replacement as the bags continuously move into the changeover region. Bag cartridges are releasably attached to flanges on the bag suspension plate by quick disconnect clamps 36.

An inlet plenum 37 at the top of the filter structure is provided to distribute the flue gas to the entrance of each of the active cartridge cells and filter bags. After passing vertically into the filter bags contained in each active cartridge and exiting through their sides and bottom, the clean flow from each cartridge proceeds into an outlet plenum 38 where it is collected and directed to the inlet of the induced draft fan 9.

The filter bags in all cartridges except those located in the changeover positions are selectively placed in the exhaust gas stream. Large cut-out apertures 39 are contained in the top fixed ceiling plate 33 which correspond to the positions of the filter cartridges in the top plate of the moving structure. These apertures allow flow to enter the filter bags when aligned with the cartridge positions. At the changeover positions 40, there are no apertures and the top fixed plate is solid, preventing flow from entering the cartridge cell positions where cartridge replacement is performed. The apertures 39 in the fixed ceiling plate 33 consist of truncated circular segments which expose only a portion of the bags in each cartridge to the entering flow.

The apertures 39 are arranged to allow flow to enter only a portion of the bags in each cartridge in a progressive manner as the cells rotate from one position to the next. This ensures that some of the bags are "shielded" from the flow at some point in the filtering process, so that some bag surface is constantly being exposed or blocked from the flow of flue gas, and fresh surface is continuously available for filtering. This is done to provide approximately a constant ratio between new and used bag surface, and hence, fairly constant pressure drop across the entire bag filterhouse during an entire cycle as fresh bags are introduced. Similar apertures in the bottom sealing plate 27 and the fixed floor plate 34 allow the flow to enter the outlet plenum 38 from the exit of the cartridge cells. These apertures are all of constant, circular shape except at the changeover positions in the bottom fixed plate where there are no apertures, and the flow is blocked, similar to the top. The effluent from the bag filters can be drained or pumped out of the filterhouse.

Upon rotation of any particular bag cartridge 23 into the changeover positions 40, the bag cartridge may be removed by releasing quick disconnect clasps 36. The bag cartridge may be removed and replaced while the cell containing the bag cartridge remains in the changeover position. It may be necessary to avoid release of exhaust gases into the ambient air near the changeover positions, perhaps to protect workers from the exhaust gas. For this purpose, the first of the two radial sections of the changeover position may be sealed and provided with a flushing system (not shown). The flushing system can be operated to draw out exhaust gases and flush the section with clean, cool ambient air.

In an alternative embodiment, the structure holding the bag cartridges may be held stationary and can be affixed to the outer housing while the ceiling and floor plates rotate to sequentially expose new cartridges to the flue gas stream. As shown in FIG. 5, in this embodiment the outer housing is provided with doors 41 for each cell which may be opened when the upper and lower plates have revolved to seal off the cell so that the bag filters may be removed for replacement or reconditioning.

While the specific embodiments of the bag filter house may be beneficially used in the practice of the invention, it is contemplated that other high efficiency filters may be used in the pollution control system.

While the system and its components have been described according to the details of the first embodiments, it can readily be understood that the inventions inherent in the described embodiments can be practiced in a variety of other specific embodiments which incorporate the inventions. The claims presented below are intended to cover the inventive concepts and are not intended to be limited to the specific embodiments described.

We claim:

1. A system for purifying the exhaust gases of a thermal power plant, including preheating fuel, combustion air, or boiler water, removing pollutants from combustion gases and discharging the purified combustion gases into the ambient air, wherein said thermal power plant comprises a boiler, a feedwater supply system which provides feedwater to the boiler through a feedwater supply line, a firebox, a combustion air intake system which provides combustion air to the firebox, a fuel injection system which provides fuel to the firebox, a combustion gas exhaust line for exhausting combustion gases including a flue downstream in the from the firebox, a filter downstream of the flue, and an exhaust stack downstream of the filter, said system comprising:

a first heat exchanger in the exhaust line downstream of the flue, said first heat exchanger capable of cooling the combustion gases to a first temperature range in which at least one combustion byproduct is readily oxidized by an oxidant;

a first oxidant injection system operably connected to the exhaust line and capable of injecting an oxidant into the combustion gases in the exhaust line;

a second heat exchanger located downstream of the first heat exchanger, said heat exchanger being capable of cooling the combustion gases to a second temperature range, said second temperature range being an optimum oxidation temperature range for at least one combustion by-product, and a second oxidant injection system operably connected to the exhaust line to inject oxidants into the exhaust line downstream of the second heat exchanger;

a basic solution injection system operably connected to the exhaust line and capable of injecting a basic solution into combustion gases in the exhaust line to create neutralization products;

a filter for filtering the oxidized combustion by-products and neutralization products formed by the injection of the basic solution from the combustion gases in the exhaust line, said filter being downstream of the points in the exhaust line at which the oxidants and basic solution are injected, a third heat exchanger downstream of the filter, said third heat exchanger being capable of cooling the filtered combustion gases to a temperature range below the dew point of water.

2. A system for purifying the exhaust gases of a thermal power plant, including preheating fuel, combustion air, or boiler water, removing pollutants from combustion gases and discharging the purified combustion gases into the ambient air, wherein said thermal power plant comprises a boiler, a feedwater supply system which provides feedwater to the boiler through a feedwater supply line, a firebox, a combustion air intake system which provides combustion air to the firebox, a fuel injection system which provides fuel to the firebox, a combustion gas exhaust line for exhausting combustion gases including a flue downstream from the firebox, a filter downstream of the flue, and an exhaust stack downstream of the filter, said system comprising:

a first heat exchanger in the exhaust line downstream of the flue, said first heat exchanger capable of cooling the combustion gases to a temperature range in which combustion by-products are readily oxidized by an oxidant;

an oxidant injection system operably connected to the exhaust line and capable of injecting an oxidant into the combustion gases in the exhaust line;

a base or basic solution injection system operably connected to the exhaust line and capable of injecting a base or basic solution into combustion gases in the exhaust line;

a filter for filtering the oxidized combustion by-products and neutralization products formed by the injection of the base or basic solution from the combustion gases in the exhaust line, wherein said filter is a bag filterhouse comprising:

a cylindrical housing having a center line and an inner wall, a circular ceiling and a circular floor, and also having a combustion gas inlet plenum above the ceiling and a clean exhaust outlet plenum below the floor;

a revolving filter bag suspension turret comprising an axle, a bag suspension plate disposed at the top of the axle, a bottom sealing plate disposed at the bottom of the axle, said axle extending along the center line of the cylindrical housing, a plurality of radial partition walls running from the bag suspension plate to the bottom sealing plate and extending from the axle to the outer edge of the turret and forming radial sections for holding filter bags, the outer diameter of the turret including the bag suspension plate and the bottom sealing plate and the radial partitions closely matching the inner diameter of the cylindrical housing;

a plurality of bag filter cartridges, each cartridge comprised of a plurality of metal mesh bag filters coated on the inside with dolomite, each bag filter cartridge releasably suspended in suspension holes provided in the bag suspension plate, said suspension holes aligned with variable shape cutouts in the ceiling;

said cutouts being shaped so as to seal some bag filters of each cartridge from incoming flow of combustion gas while the cartridge is below the cutout during its rotation on the turret, each of said cutouts differing from the others in shape so as to expose different bags of the cartridges as the cartridges move under each cutout;

at least one change-over section in the bag house outer cylinder defined by an opening in the outer cylinder large enough to allow removal of the bag filter cartridge, the portion of the ceiling above the change-over section being solid and not provided with openings, the portion of the round floor under the change-over section being solid and not provided with openings, such that the changeover section is open to the atmosphere while other bag filter sections are in the combustion gas exhaust stream;

said filter being downstream of the points in the exhaust line at which the oxidant and base or basic solution are injected, a second heat exchanger downstream of the filter, said second heat exchanger being capable of cooling the filtered combustion gases to a temperature range below the dew point of water.

3. A system for purifying the exhaust gases of a thermal power plant, including preheating fuel, combustion air, or boiler water, removing pollutants from combustion gases and discharging the purified combustion gases into the ambient air, wherein said thermal power plant comprises a boiler, a feedwater supply system which provides feedwater to the boiler through a feedwater supply line, a firebox, a combustion air intake system which provides combustion air to the firebox, a fuel injection system which provides fuel to the firebox, a combustion gas exhaust line for exhausting combustion gases including a flue downstream the firebox, a filter downstream of the flue, and an exhaust stack downstream of the filter, said system comprising:

a first heat exchanger in the exhaust line downstream of the flue, said first heat exchanger capable of cooling the combustion gases to a temperature range in which combustion by-products are readily oxidized by an oxidant;

an oxidant injection system operably connected to the exhaust line and capable of injecting an oxidant into the combustion gases in the exhaust line;

a base or basic solution injection system operably connected to the exhaust line and capable of injecting a base or basic solution into combustion gases in the exhaust line;

a filter for filtering the oxidized combustion by-products and neutralization products formed by the injection of the base or basic solution from the combustion gases in the exhaust line, wherein said filter is a bag filterhouse comprising:

a cylindrical housing having a center line and an inner wall, a circular ceiling and a circular floor, and also having a combustion gas inlet plenum above the ceiling and a clean exhaust outlet plenum below the floor;

said circular ceiling and circular floor being rotatable within the housing, together with a motor operably connected to the ceiling and floor to rotate the ceiling and floor;

a bag suspension turret comprising an central post, a bag suspension plate disposed at the top of the axle, a bottom sealing plate disposed at the bottom of the axle, said central post extending along the center line of the cylindrical housing, a plurality of radial partition walls running from the bag suspension plate to the bottom sealing plate and extending from the central post to the outer edge of the turret and forming radial sections for holding filter bags, the outer diameter of the turret including the bag suspension plate and the bottom sealing plate and the radial partitions closely matching the inner diameter of the cylindrical housing, said bag suspension plate and bottom sealing plate being fixed along their outer diameter to inner wall of the cylindrical housing;

a plurality of bag filter cartridges, each cartridge comprised of a plurality of metal mesh bag filters coated on the inside with dolomite, each bag filter cartridge releasably suspended in suspension holes provided in the bag suspension plate;

a circular ceiling and circular floor being rotatable within the housing, together with a motor operably connected to the ceiling and floor to rotate the ceiling and floor; said circular ceiling characterized by radial segments corresponding to the radial segments of the turret, at least one of said segments being complete and without any cutout, the remaining said segments being provided with variable shape cutouts positioned above the bag cartridges such that upon rotation of the ceiling plate the cutouts move over the bag cartridges and variably expose bags to the combustion gas stream, said floor also characterized by radial segments corresponding to the radial segments of the turret, at least one of said segments being complete and without any cutout, the remaining said segments being provided with exhaust holes through which combustion gases can flow into the bottom plenum;

a plurality of doors in the outer housing, each of said doors providing access to at least one cell of the turrets said doors providing access to the bag cartridges;

said filter being downstream of the points in the exhaust line at which the oxidant and base or basic solution are injected, a second heat exchanger downstream of the filter, said second heat exchanger being capable of cooling the filtered combustion gases to a temperature range below the dew point of water.

4. A bag filterhouse comprising:

a cylindrical housing having a center line and an inner wall, a circular ceiling and a circular floor, and also having a combustion gas inlet plenum above the ceiling and a clean exhaust outlet plenum below the floor;

said circular ceiling and circular floor being rotatable within the housing, together with a motor operably connected to the ceiling and floor to rotate the ceiling and floor;

a bag suspension turret comprising an central post, a bag suspension plate disposed at the top of the axle, a bottom sealing plate disposed at the bottom of the axle, said central post extending along the center line of the cylindrical housing, a plurality of radial partition walls running from the bag suspension plate to the bottom sealing plate and extending from the central post to the outer edge of the turret and forming radial sections for holding filter bags, the outer diameter of the turret including the bag suspension plate and the bottom sealing plate and the radial partitions closely matching the inner diameter of the cylindrical housing, said bag suspension plate and bottom sealing plate being fixed along their outer diameter to inner wall of the cylindrical housing;

a plurality of bag filter cartridges, each cartridge comprised of a plurality of metal mesh bag filters coated on the inside with dolomite, each bag filter cartridge releasably suspended in suspension holes provided in the bag suspension plate;

a circular ceiling and circular floor being rotatable within the housing, together with a motor operably connected to the ceiling and floor to rotate the ceiling and floor; said circular ceiling characterized by radial segments corresponding to the radial segments of the turret, at least one of said segments being complete and without any cutout, the remaining said segments being provided with variable shape cutouts positioned above the bag cartridges such that upon rotation of the ceiling plate the cutouts move over the bag cartridges and variably expose bags to the combustion gas stream, said floor also characterized by radial segments corresponding to the radial segments of the turret, at least one of said segments being complete and without any cutout, the remaining said segments being provided with exhaust holes through which combustion gases can flow into the bottom plenum; and a plurality of doors in the outer housing, each of said doors providing access to at least one cell of the turret, said doors providing access to the bag cartridges.

5. A bag filterhouse comprising:

a housing having a center line and an inner wall, a ceiling and a floor, and also having a combustion gas inlet plenum above the ceiling and a clean exhaust outlet plenum below the floor;

a revolving filter bag suspension turret comprising an axle, a bag suspension plate disposed at the top of the axle, a bottom sealing plate disposed at the bottom of the axle, said axle extending along the center line of the cylindrical housing, a plurality of radial partition walls running from the bag suspension plate to the bottom sealing plate and extending from the axle to the outer edge of the turret and forming radial sections for holding filter bags, the outer diameter of the turret including the bag suspension plate and the bottom sealing plate and the radial partitions forming a close seal with the cylindrical housing;

a plurality of bag filter cartridges, each cartridge comprised of a plurality of bag filters coated on the inside with dolomite, each bag filter cartridge releasably suspended in suspension holes provided in the bag suspension plate, said suspension holes aligned with variable shape cutouts in the ceiling;

said cutouts being shaped so as to seal some bag filters of each cartridge from incoming flow of combustion gas while the cartridge is below the cutout during its rotation on the turret, each of said cutouts differing from the others in shape so as to expose different bags of the cartridges as the cartridges move under each cutout;

at least one change-over section in the bag house outer cylinder defined by an opening in the outer cylinder large enough to allow removal of the bag filter cartridge, the portion of the ceiling above the change-over section being solid and not provided with openings, the portion of the round floor under the change-over section being solid and not provided with openings, such that the changeover section is open to the atmosphere while other bag filter sections are in the combustion gas exhaust stream.

6. A bag filterhouse comprising:

a cylindrical housing having a center line and an inner wall, a circular ceiling and a circular floor, and also having a combustion gas inlet plenum above the ceiling and a clean exhaust outlet plenum below the floor;

a revolving filter bag suspension turret comprising an axle, a bag suspension plate disposed at the top of the axle, a bottom sealing plate disposed at the bottom of the axle, said axle extending along the center line of the cylindrical housing, a plurality of radial partition walls running from the bag suspension plate to the bottom sealing plate and extending from the axle to the outer edge of the turret and forming radial sections for holding filter bags, the outer diameter of the turret including the bag suspension plate and the bottom sealing plate and the radial partitions closely matching the inner diameter of the cylindrical housing;

a plurality of bag filter cartridges, each cartridge comprised of a plurality of metal mesh bag filters coated on the inside with dolomite, each bag filter cartridge releasably suspended in suspension holes provided in the bag suspension plate, said suspension holes aligned with variable shape cutouts in the ceiling;

said cutouts being shaped so as to seal some bag filters of each cartridge from incoming flow of combustion gas while the cartridge is below the cutout during its rotation on the turret, each of said cutouts differing from the others in shape so as to expose different bags of the cartridges as the cartridges move under each cutout;

at least one change-over section in the bag house outer cylinder defined by an opening in the outer cylinder large enough to allow removal of the bag filter cartridge, the portion of the ceiling above the change-over section being solid and not provided with openings, the portion of the round floor under the change-over section being solid and not provided with openings, such that the changeover section is open to the atmosphere while other bag filter sections are in the combustion gas exhaust stream.

* * * * *